Figure 1:
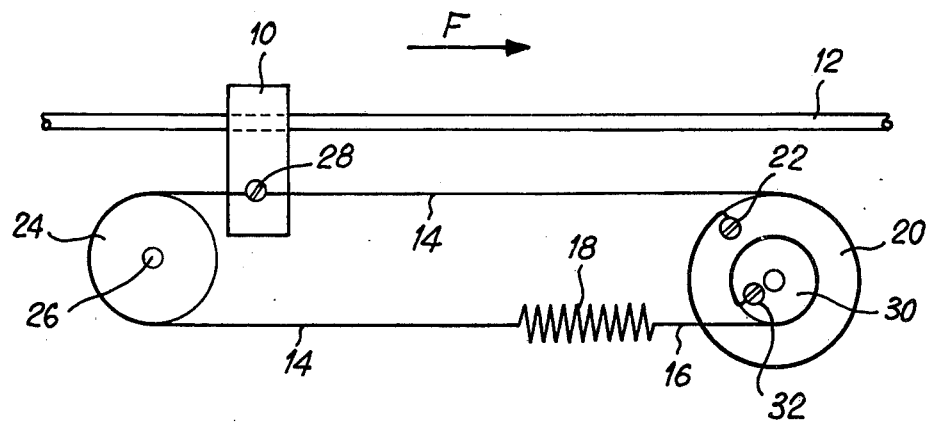

United States Patent [19]

Cassier

[11] 4,149,810
[45] Apr. 17, 1979

[54] CARRIAGE RETURN DEVICE

[75] Inventor: Daniel S. Cassier, Gazeran Batanceau, France

[73] Assignee: "Meci" Material Electrique de Controle et Industriel, Paris, France

[21] Appl. No.: 869,771

[22] Filed: Jan. 16, 1978

[30] Foreign Application Priority Data

Jan. 20, 1977 [FR] France .................. 77 01544

[51] Int. Cl.² ............................................ B41J 19/72
[52] U.S. Cl. ................................. 400/317.2; 400/320
[58] Field of Search .............. 400/317.2, 320, 320.1, 400/335, 336, 336.1

[56] References Cited

U.S. PATENT DOCUMENTS

| 441,705 | 12/1890 | Romme | 400/317.2 |
| 1,056,657 | 3/1913 | Friedman | 400/317.2 X |
| 3,519,115 | 7/1970 | Smith | 400/320 X |
| 3,872,960 | 3/1975 | Gabor | 400/320 X |

FOREIGN PATENT DOCUMENTS

| 2263518 | 7/1974 | Fed. Rep. of Germany | 400/320.1 |
| 2523691 | 12/1976 | Fed. Rep. of Germany | 400/320 |
| 2273666 | 1/1976 | France | 400/317.1 |
| 9127 of | 1906 | United Kingdom | 400/317.2 |

Primary Examiner—Ernest T. Wright, Jr.
Attorney, Agent, or Firm—Thomas J. Greer, Jr.

[57] ABSTRACT

The invention relates to a device for returning a carriage driven in translation in a forward stroke by means of a traction wire and returned to its starting position by means of a return spring, wherein said return spring acts on the carriage by means of the traction wire and the traction wire passes around an idle guide pulley and its two ends are wound on coaxial pulleys, of different diameters, rotating with each other. The invention finds particular application to reading and/or writing apparatus.

5 Claims, 2 Drawing Figures

CARRIAGE RETURN DEVICE

The present invention relates to a device for returning a carriage, and more particularly to a device for returning a carriage in a writing and/or reading apparatus such as for example a teleprinter machine.

In the known devices of this type, the carriage which is provided with a writing and/or reading head is driven in translation in a forward stroke by means of a traction wire under the action of a suitable drive member and is returned to its starting position by means of a return spring acting directly on the carriage.

In such devices, the return spring is a tensioned spring, one end of which is connected to the chassis of the machine and the other end is connected to the carriage.

This results in the longitudinal extension of the spring corresponding virtually to the stroke of the carriage, which presents certain drawbacks due particularly to the fact that the spring must be of large dimensions.

It is an object of the invention to avoid such drawbacks by proposing a return device enabling a spring to be used whose longitudinal extension is much less than the stroke of the carriage.

The present invention therefore relates to a device for returning a carriage, particularly in a writing and/or reading apparatus, driven in translation in a forward stroke by means of a traction wire and returned to its starting position by means of a return spring, wherein the return spring acts on the carriage by means of the traction wire and the traction wire passes around an idle guide pulley and its two ends are wound on coaxial pulleys of different diameters, rotating with each other.

According to another feature of the device of the invention, the wire is so fixed to the carriage that, when the carriage moves in the forward stroke, the wire unwinds from the pulley of smaller diameter and winds on the pulley of larger diameter, causing the spring to extend and that, under the action of the tension exerted on the wire by the spring, the wire unwinds from the pulley of larger diameter and winds on the pulley of smaller diameter, causing the return of the carriage towards its starting position.

Figure 2:
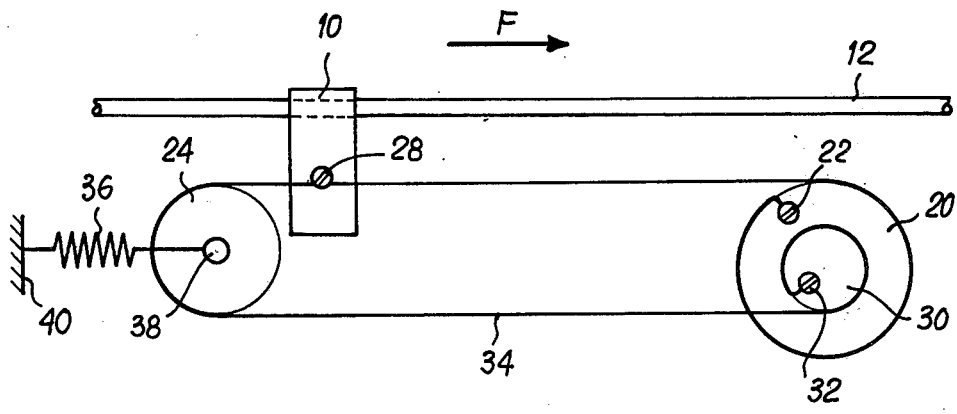

The invention will be more readily understood on reading the following description with reference to the accompanying drawing, in which:

FIG. 1 shows a device in accordance with a first embodiment of the invention, in which the traction wire is constituted by two parts connected by the spring, and FIG. 2 shows a device in accordance with a second embodiment of the invention in which the guide pulley is movable in translation and is returned by the spring.

In these Figures, like elements are designated by like references.

Referring now to the drawing, FIG. 1 shows a device which comprises a carriage 10 movable in translation along a rectilinear guide rail 12. This carriage 10 may be driven in translation in a forward stroke, in the direction shown by arrow F, and then be returned to its starting position in a return stroke opposite the direction of arrow F.

The device further comprises a traction wire constituted by a part 14 and a part 16 connected by a tensioned spring 18. Part 14 is wound by one of its ends on a pulley 20 on which it is fixed by means of a screw 22, passes around an idle guide pulley 24 rotating about a fixed axis 26, and is fixed by its other end to the spring 18. Moreover, part 14 is fixed to the carriage 10 by means of a screw 28. The part 16 is fixed by one of its ends to the spring 18 and is wound by its other end on a pulley 30 on which it is fixed by means of a screw 32. The pulley 30 and pulley 20 are coaxial and rotate with each other, but are of different diameters, the diameter of pulley 30 being smaller than that of pulley 20.

The pulleys 20 and 30 are coupled to a suitable drive member (not shown) adapted to drive them in rotation to effect the displacement of the carriage 10 in its forward stroke.

During this displacement, the part 16 of the wire unwinds from pulley 30, whilst part 14 winds on pulley 20.

Since pulley 20 has a larger diameter than that of pulley 30, and these two pulleys 20, 30 rotate with each other, the length of the part 14 which winds on pulley 20 is greater than the length of the part 16 which unwinds from pulley 30 and consequently the spring 18 extends by a length corresponding to the difference between the length of wire wound and the length of wire unwound.

When the carriage 10 is at the end of its stroke, the spring 18 has increased by a length shorter than the stroke of the carriage 10 and proportional to the difference in diameter of the pulleys 20 and 30. At the end of stroke of the carriage 10, the drive member coupled to the pulleys 20 and 30 is no longer actuated and the carriage 10 tends to return to its starting position under the action of the return member. As, under the action of the spring 18, the torque exerted by the part 14 on the pulley 20 is greater than the torque exerted by the part 16 on the pulley 30, the part 14 unwinds from pulley 20 and part 16 winds on pulley 30 under the action of the contraction of the spring 18, causing the carriage 10 to return to its starting position.

The device shown in FIG. 2 is identical to that of FIG. 1, except that the traction wire is composed of one part only 34, one of the ends of which is wound and fixed on pulley 20 and the other end of which is wound and fixed on pulley 30 and, that the guide pulley 24 is mobile in translation and returned by a spring 36 in the direction corresponding to the tension of the wire 34.

The guide pulley 24 is mounted idly on a shaft 38 fast with one of the ends of the spring 36 whilst the other end of this spring 36 is fixed to the frame 40 of the machine which is equipped with the return device.

The device of FIG. 2 functions in the same way as the device of FIG. 1. The only difference lies in the fact, that, during the forward stroke of the carriage 10, the pulley 24 moves nearer the pulleys 20 and 30 and the spring 36 extends and, during the return stroke of the carriage 10, the pulley 24 moves away from the pulleys 20 and 30 and the spring 36 contracts.

In the two devices shown in the accompanying drawing, the diameter of the guide pulley 24 is equal to the arithmetical average of the diameters of the pulleys 20 and 30 so that the two segments of the traction wire are parallel to the direction of translation of the carriage 10.

It will be understood that the pulleys 20 and 30 constitute a differential device, the characteristic of which depends on the difference in diameter between these two pulleys 20, 30 since this difference determines the extension of the spring 18, 36 between the starting position and the end of stroke position. In the case of the device of FIG. 2, all else being otherwise equal, the extension of the spring 36 will be two times less than the extension of the spring 18 of the device of FIG. 1.

The device of the invention may be associated with any type of apparatus in which a carriage provided with a reading and/or writing head is adapted to read and/or write information on a support such as a sheet of paper.

Thus, the device according to the invention may be associated for example with a teleprinting machine comprising a cylindrical drum on which is wound a sheet of paper in order to read and/or write information thereon. In such a machine where the cylindrical drum is animated by a movement of rotation and the carriage by a movement of translation in a direction parallel to the axis of rotation of the drum, the scanning of the sheet of paper is effected along a spiral trajectory.

The invention is of course not limited to the two embodiments which have been described hereinabove and illustrated in the drawing and it extends to the variant embodiments in accordance with the spirit of the invention.

Thus, the return spring used in the device of the invention is preferably a tensioned coil spring, but it may also be constituted by an equivalent elastic member such as for example an elastic rubber belt.

The traction wire is made of a non-extensible material, for example steel, but it could also be constituted by a chain.

What is claimed is:

1. In a writing and/or reading apparatus, a device for returning a carriage driven in translation in a forward stroke by means of a traction wire and returned to its starting position by means of a return spring via the traction wire, wherein the traction wire passes around an idle guide pulley and its two ends are wound on coaxial pulleys of different diameters, rotating with each other.

2. The device of claim 1, wherein the wire is so fixed to the carriage that, when the carriage moves in the forward stroke, the wire unwinds from the pulley of smaller diameter and winds on the pulley of larger diameter, causing the spring to extend, and that, under the action of the tension exerted on the wire by the spring, the wire unwinds from the pulley of larger diameter and winds on the pulley of smaller diameter, causing the return of the carriage towards its starting position.

3. The device of claim 1, wherein the traction wire is constituted by two parts connected by said spring.

4. The device of claim 3, wherein the idle pulley rotates about a fixed axis.

5. The device of claim 1, wherein the guide pulley is mobile in translation and is returned by said spring in the direction corresponding to the tension of the wire.

* * * * *